United States Patent [19]

Eckhardt

[11] 4,356,484
[45] Oct. 26, 1982

[54] METHOD FOR TRANSMITTING DATA IN A TIME MULTIPLEX TRANSMISSION

[75] Inventor: Gert Eckhardt, Backnang, Fed. Rep. of Germany

[73] Assignee: Licentia Patent Verwaltungs-G.m.b.H., Frankfurt am Main, Fed. Rep. of Germany

[21] Appl. No.: 176,558

[22] Filed: Aug. 8, 1980

[30] Foreign Application Priority Data

Aug. 11, 1979 [DE] Fed. Rep. of Germany ....... 2932701

[51] Int. Cl.³ .......................... H04B 1/00; H04Q 7/00; H04Q 9/00
[52] U.S. Cl. ................................ 340/825.03; 455/54; 455/31; 370/95
[58] Field of Search ...................... 340/147 C, 147 R; 375/7; 370/82, 96, 95; 455/31, 53, 54

[56] References Cited

U.S. PATENT DOCUMENTS

| | | | |
|---|---|---|---|
| 3,678,391 | 7/1972 | Gough | 455/54 |
| 3,714,650 | 1/1973 | Fuller et al. | 343/112 TC |
| 3,982,077 | 9/1976 | Clark et al. | 370/95 |
| 4,012,597 | 3/1977 | Lynk, Jr. et al. | 455/54 |
| 4,152,647 | 5/1979 | Gladden et al. | 455/54 |
| 4,247,908 | 1/1981 | Lockhart, Jr. et al. | 455/31 |

FOREIGN PATENT DOCUMENTS

| | | |
|---|---|---|
| 2625475 | 6/1978 | Fed. Rep. of Germany . |
| 2844453 | 4/1980 | Fed. Rep. of Germany ........ 370/96 |
| 52-40910 | 3/1977 | Japan ..................... 370/82 |

OTHER PUBLICATIONS

"Datenfunknetz der Polizei NW", by Dr. H. Rüberg in Sach—und Personenregister, Aug. 1977.

Primary Examiner—Donald J. Yusko
Attorney, Agent, or Firm—Spencer & Kaye

[57] ABSTRACT

A method for transmitting data between at least one central office and a plurality of mobile radio stations via a relay station by a time multiplex transmission procedure in which signals are transmitted in a succession of time frames structure and the central office transmits on a first frequency to all mobile radio stations via the relay station, which method includes:

causing the central office to periodically transmit different messages at arbitrarily selected times, which messages include routine inquiry messages directed to each mobile station in sequence during each time frame;

causing each mobile station to respond to an inquiry message by transmitting a selected short message on a second frequency;

causing a selected mobile station to transmit data to the central office by transmitting to the central office an announcement of the intent to transmit data during a first time frame, causing the central office to set aside reception capacity for the data in a time frame following the first time frame, and transmitting the data to the central office during the following time frame; and causing the duration of each time frame to vary, on the basis of data transmitted during at least one preceding time frame, between a minimum value determined by the time required to transmit a routine inquiry to each mobile station and a maximum value determined by the time required to transmit data to and from all mobile stations.

4 Claims, 4 Drawing Figures

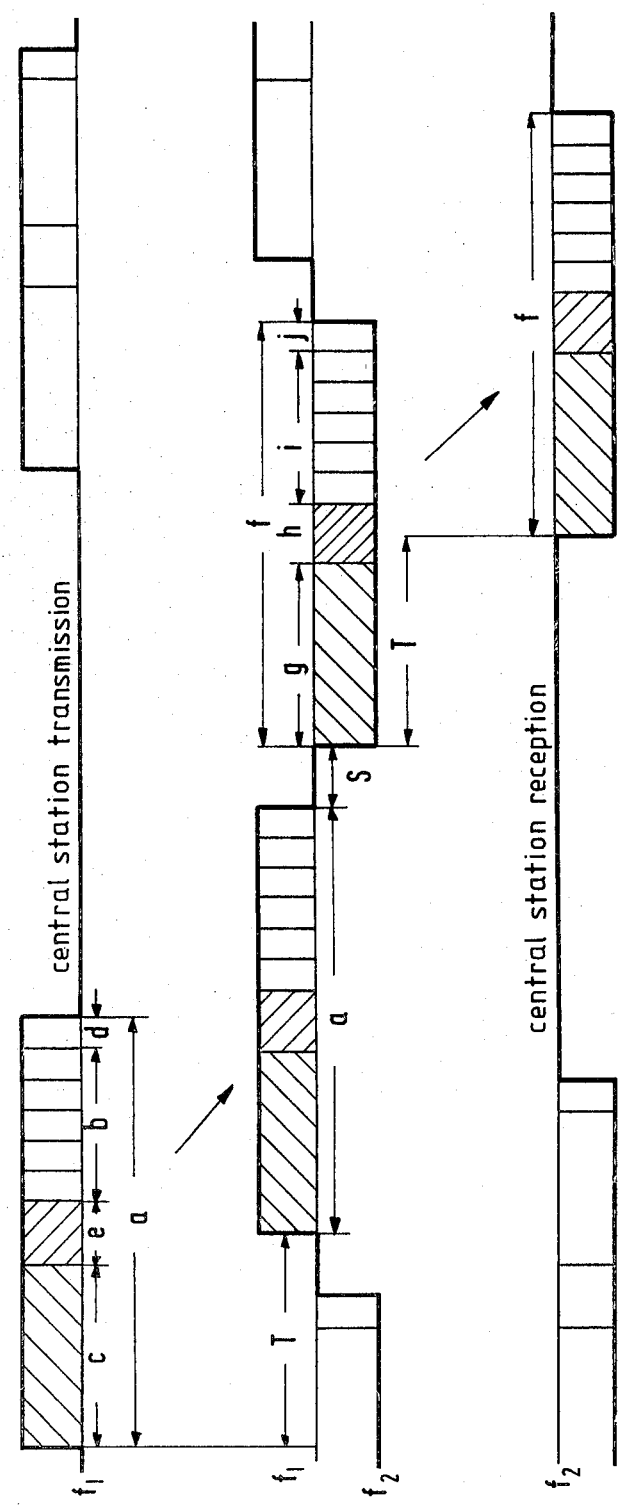

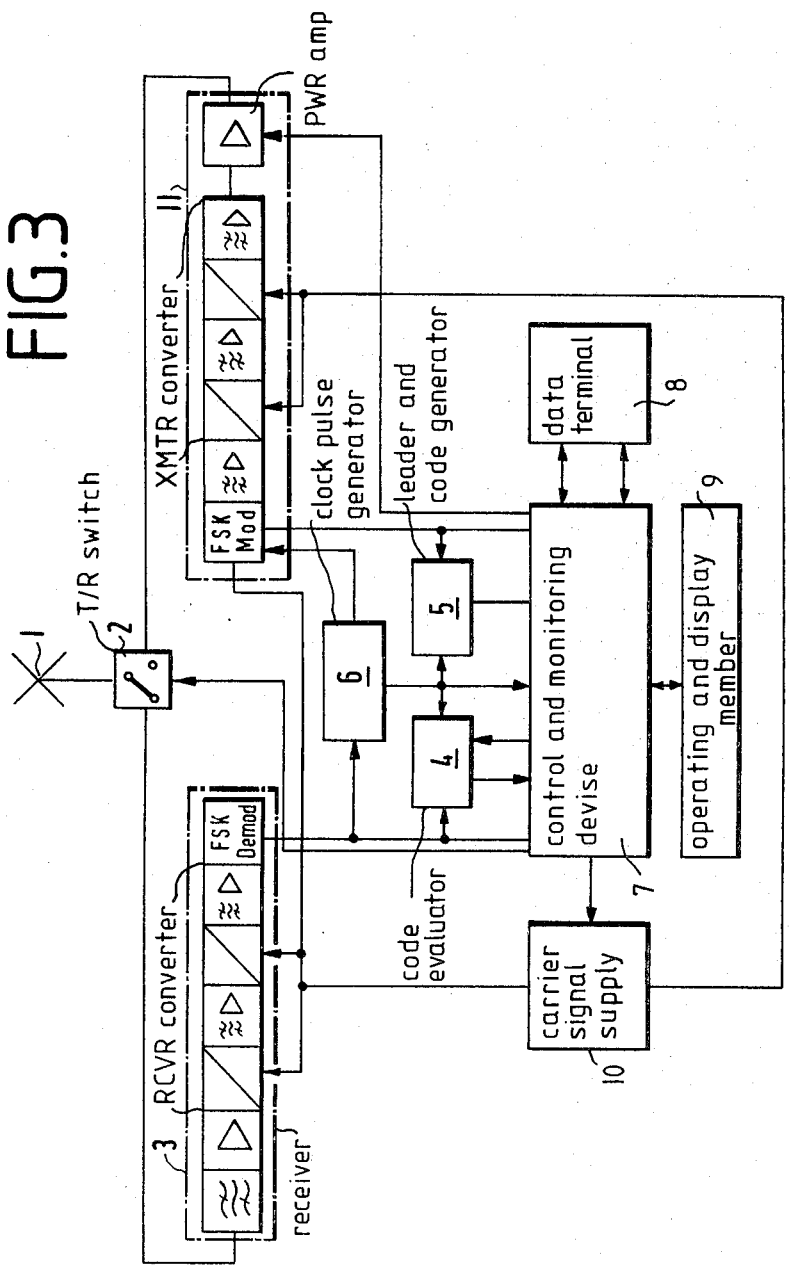

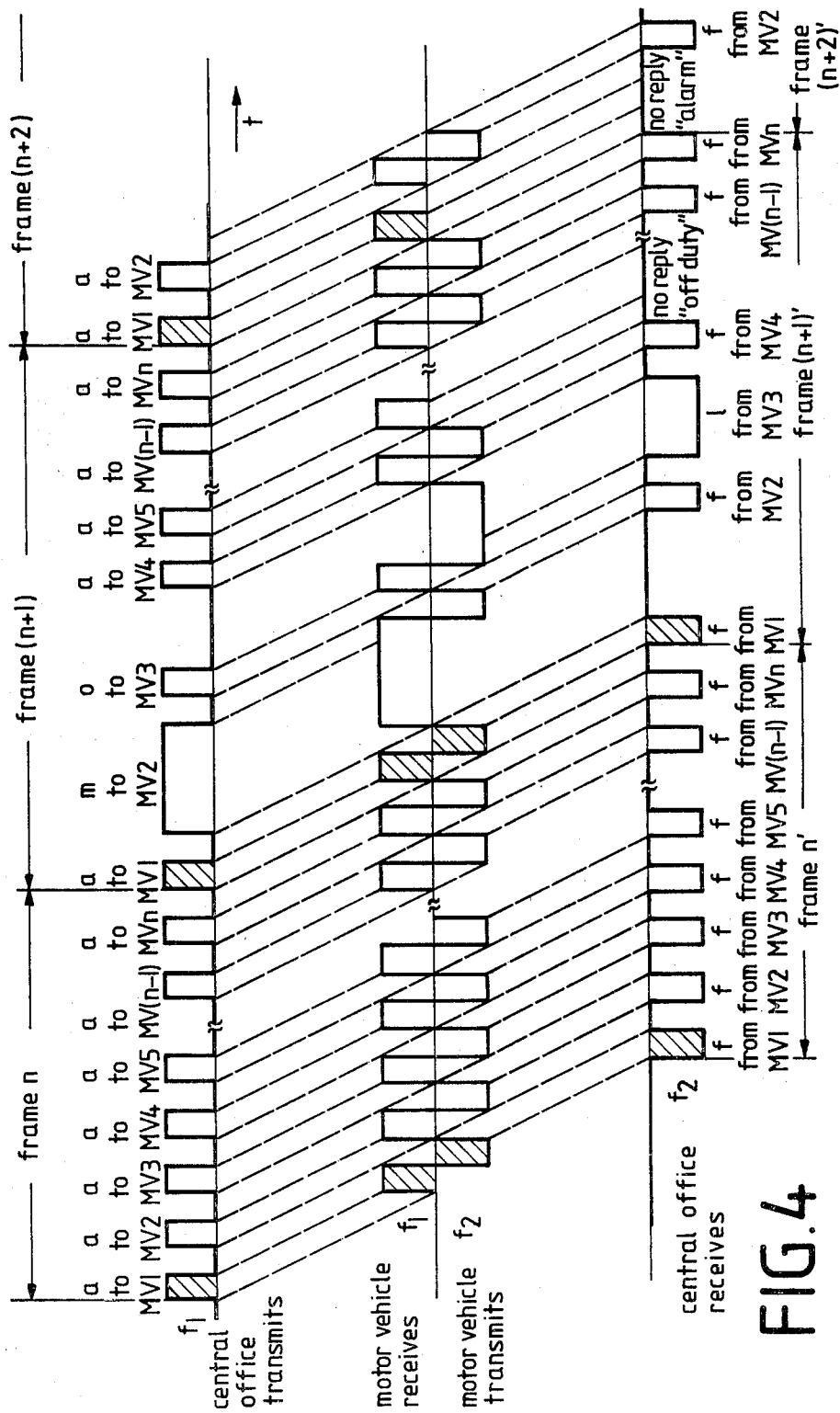

METHOD FOR TRANSMITTING DATA IN A TIME MULTIPLEX TRANSMISSION

BACKGROUND OF THE INVENTION

The present invention relates to a method for transmitting data between at least one central office and mobile radio stations, via a relay station, according to the time multiplex transmission principle (TDMA) with a time frame structure, the central office transmitting on one frequency to all mobile radio stations via the relay station.

A radio transmission system with stationary and mobile radio stations is disclosed in German Offenlegungsschrift [Laid-open Application] No. 26 25 475. The radio connection in this radio transmission system is monitored in that the high frequency carrier power level of the connection is continuously measured and if it falls below a certain value, the connection is switched from a first stationary radio telephone station to a second stationary radio telephone station which offers better receiving conditions for the mobile radio station.

The drawback in this system is the organization of these radio networks. The network is divided into a large number of radio regions with numerous stationary relay stations. Overlapping of these radio regions results in interference, i.e., loss of selectivity, and data flow between the numerous stationary relay stations and the central office with high expenditures for operating personnel and apparatus. There is also known a radio data network described by H. Ruberg in "Datenfunknetz der Polizei NW" [Data Radio Network for the Police of NW] PTV (Police Technical Matters—Traffic) 8/77, cited in Sach—und Personenregister Jahrgang 1977 [Register of Subject Matter and Individuals Volume 1977]. In this radio transmission system the sequence of operations is also complicated since whenever the central office sends a message to a selected mobile radio station, all other mobile radio stations are prevented from transmitting.

SUMMARY OF THE INVENTION

It is an object of the invention to make possible data transmission between at least one central office and mobile radio stations, via a relay station, according to the time multiplex transmission principle (TDMA) which is effected at low expense for personnel and instruments, has a time frame structure of flexible length and simplifies the structure of the radio transmission network.

This and other objects are achieved, according to the invention, by the performance of a method for transmitting data betwen at least one central office and a plurality of mobile radio stations via a relay station by a time multiplex transmission procedure in which a time frame structure is established and the central office transmits on a first frequency to all mobile radio stations via the relay station, which method is carried out by:

causing the central office to periodically transmit different messages at arbitrarily selected times, which messages include routine inquiry messages directed to each mobile station in sequence;

causing each mobile station to respond to an inquiry message by transmitting a selected short message on a second frequency;

causing a selected mobile station to transmit data to the central office by transmitting to the central office an announcement of the intent to transmit data during a first time frame, causing the central office to set aside reception capacity for the data, and subsequently transmitting the data to the central office; and causing the duration of each time frame to vary, on the basis of current transmission requirements, between a minimum value determined by the time required to transmit a routine inquiry to each mobile station and a maximum value determined by the time required to transmit data to or from all mobile stations.

It is of advantage, if much data is exchanged between the central office and a few mobile radio stations, to provide additional channels in the system.

If a routine message does not come in from a mobile radio station within a certain time period, it is advisable to automatically cause an alarm to be set off.

The advantages of routine call-up by the central office and reply by the mobile stations in different frequencies are that the central office knows all of the mobile radio stations on duty and will be able to detect emergencies or nonreadiness for duty inspite of a ready-for-duty message if a routine message is not acknowledged. Additionally the provision of available channels for increased requirements for data exchange, i.e., a large quantity of data within routine messages, assures that the time frame for one call-up cycle for all mobile radio stations by the central office does not become too long. It is thus possible to contact all mobile radio stations within a relatively short, predetermined period of time.

BRIEF DESCRIPTION OF THE DRAWING

FIG. 2 is a series of time diagrams to a larger time scale than FIG. 1 showing the structure of messages between central office and motor vehicle.

FIG. 3 is a simplified block circuit diagram for a motor vehicle data radio constructed to operate according to the invention.

FIG. 4 is a series of time diagrams showing in more detail the various modes of operation given in FIG. 1 as an example.

DESCRIPTION OF THE PREFERRED EMBODIMENTS

Figure 1:
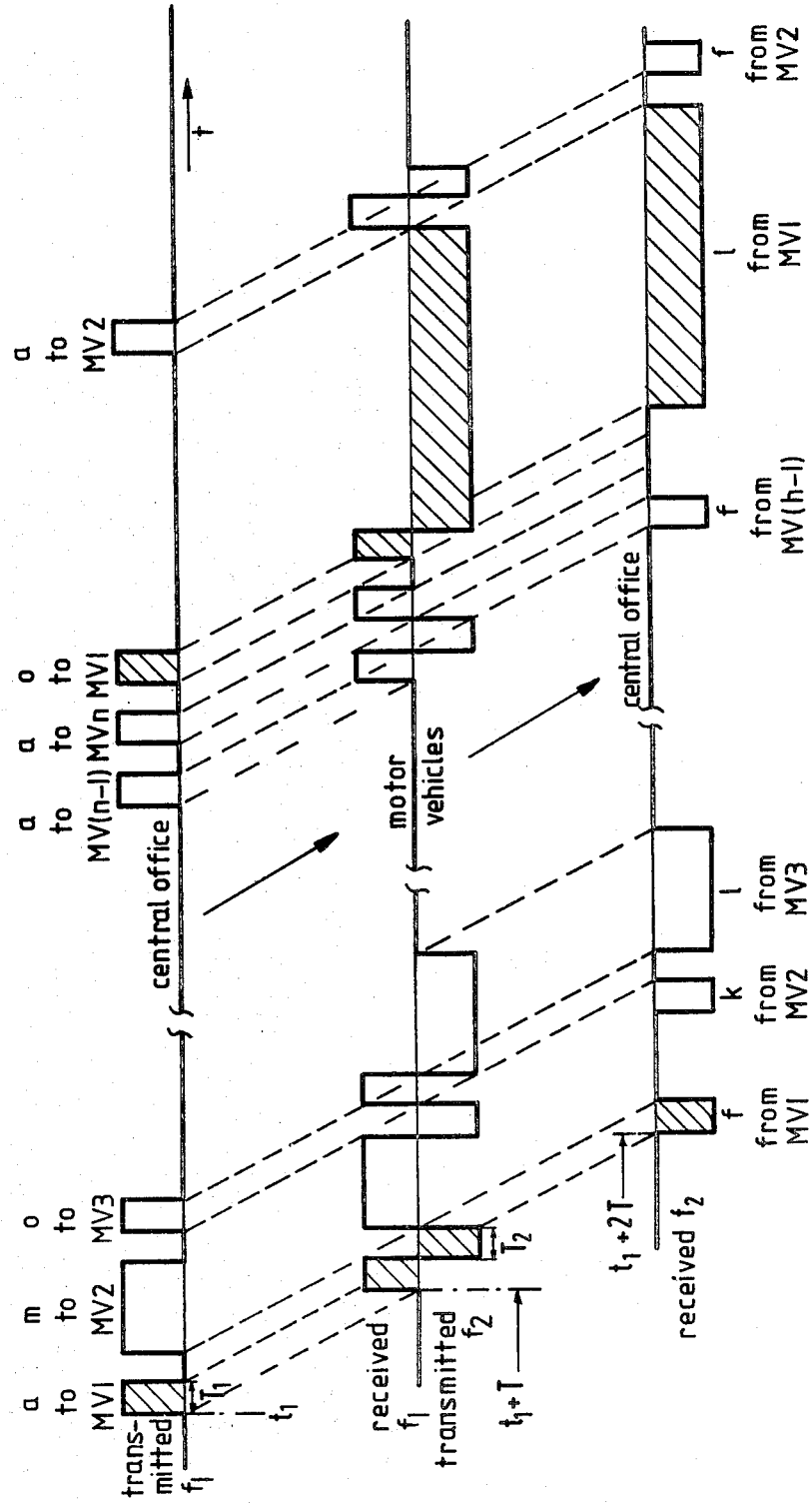
FIG. 1 is a series of time diagrams showing the sequence of a transmission from a central office to a motor vehicle and back to the central office.

The illustrated embodiment is based on a system in which the relay station is represented by an earth satellite. It is thus possible to assure sufficient radio communications over a large area, defined by the broadcast range of the satellite. Of course, for regional application the method can also be practiced with a terrestrial relay station.

The mobile radio stations are motor vehicles which are equipped with data radios which transmit data in digital form. The data radios of the motor vehicles include memories for the data in the data terminals.

Data transmission from the central office to the motor vehicles includes messages for all motor vehicles, and/or for a certain group of motor vehicles and/or for individual motor vehicles. Messages intended for all motor vehicles or for a certain group of motor vehicles do not require acknowledgement by the motor vehicles. All messages for individual motor vehicles are acknowledged.

Due to the long signal travel time, for example about 500 ms, between transmission of the messages and acknowledgement, the use of separate frequency channels for transmissions from the central office to the motor vehicles and from the motor vehicles to the central office is necessary to permit optimum channel utilization.

Most of the information transmitted from the motor vehicles to the central office consists of short routine messages which are acknowledged by the central office. Longer messages occur less frequently and can, if they are to be transmitted, be announced in the format of the routine messages.

In the practice of the method according to the invention, two sequences of messages are transmitted at different frequencies. Message sequence 1 contains the messages, inquiries and control instructions from the central office; message sequence 2 contains the messages and inquiries from the motor vehicles. Two satellite channels are required for this purpose. Further channels are available for connections requiring more time.

FIG. 1 shows the sequence of a transmission from the central office to motor vehicles and back to the central office. At time $t_1$ the central office directs a routine inquiry a to the motor vehicle MV1 on frequency $f_1$. The inquiry reaches the motor vehicle at time $t_1 + T$ (T=travel time ground-satellite-ground). At $t_2$ the motor vehicle sends an acknowlegement on frequency $f_2$ which reaches the central office at time $t_2 + T = t_1 + 2T$.

In order to simplify organization, it is necessary to standardize the messages. The routine inquiries a from the central office have a fixed length $T_1$ dictated by the length of the transmitted text. As shown in FIG. 2, a routine inquiry may typically consist of a synchronizing leader c, a synchronizing word e and the transmitted text b. The text b includes identification of the vehicle code number or a group code identifying a group of vehicles to receive a message, a code word announcing that an information transmission is to follow or acknowledging an information transmission, and several check bits d.

The motor vehicle replies to the routine inquiry a beginning at time $t_2$ via a channel having the frequency $f_2$. A certain safety time S of about 2 ms should expire between the end of a and start of the reply to prevent overlapping of transmissions from motor vehicles at different locations. The missing reply of motor vehicle n in FIG. 1 is caused by an earlier "off duty" message to the central office. The routine reply f from the motor vehicle, as shown in FIG. 2, is also standardized, of a length $T_2$, and includes a synchronizing leader g, a synchronizing word h, a text i and check bits j. The text i includes identification of the transmitting vehicle and a standard text which may contain the following messages: nothing new, off duty, back on duty, desire to transmit message (telegram/text, length of transmission), acknowledgement of receipt, emergency call/alarm.

The sequence of operations will be explained with the aid of an example which can be performed with the mobile radio station apparatus shown in FIG. 3, and in which all mobile stations are being periodically contacted.

At the start of a tour of duty, after feeding of the message "on duty" into an operating and display member 9, the mobile station data radio answers the next routine inquiry a from the central office with its acknowledgement f. This establishes a connection. If no messages are to be transmitted, the data radio answers each routine inquiry a with a standard text signifying "Nothing New". In this way the operability of the connection is monitored.

A message m from the central office, to all units or to one or several units, is announced by an appropriate code word. The data radio switches to "receiving," the message is recorded at the next call, i.e., in the next time frame, and the arrival of a message is indicated and acknowledged by a transmission k to the central office. If the message was received scrambled, a repeat of the message is initiated.

When the motor vehicle sends a message, a signal "message transmission desired" causes the central office to either release a corresponding time slot 1 on frequency $f_2$ for data, as depicted in FIG. 1, or causes the motor vehicle transmitter to be switched to a free frequency $f_n$ for transmissions requiring more time. Upon completion of the transmission, the instrument is switched back to frequency $f_2$ or the time slot is reduced.

At the end of a tour of duty of the vehicle, the central office is informed by the message "off duty" that there will not be any acknowledgements to inquiries for some time.

If all routine inquiries a from the central office have been transmitted successively in time, a check-back o with the vehicles begins according to the same principle as the inquiries, also as shown in FIG. 1.

Manually or automatically produced alarm messages are emitted on request. It is then not necessary to first indicate "on duty." This operation is normally handled on a channel which is common to all vehicles. In special cases, groups of vehicles can operate in the same manner on substitute channels.

The operation of the data radios in the motor vehicles will be explained in detail with the aid of FIG. 3. Depending on the structure of the messages from the central office and the motor vehicles, a signal received from the relay station travels from the antenna 1, which for transmission in the UHF range is preferably a microstrip antenna, through an antenna relay 2, which effects switching between transmitting and receiving operation, to a receiver 3. There it is amplified in a low-noise preamplifier and after being appropriately converted it is demodulated in a frequency shift keying (FSK) demodulator.

The demodulated signal is evaluated in a code evaluator 4, composed in a known manner of a number of shift registers or correlators and controls therefor for searching the incoming stream of bits for certain code words, for codes intended for the instrument in question, which are then evaluated. The code evaluation 4, as well as a leader and code generator 5, which is a bit pattern generator for producing a sequence of synchronizing bits and certain code words, e.g. routine answers and acknowledgements, are controlled by a common clock pulse generator 6.

If a longer message is intended for the instrument in question, a connection is established by a control and monitoring device 7, which essentially includes switches and sensors for controlling the code evaluator 4, the leader and code generator 5, the receiver 3, a transmitter 4 and the antenna relay 2 and for monitoring these components, with a data terminal 8, which may be, for example, a Bosch MCT 10 without modem or a Data-geet 2064 by Ferrodyna AG, Zurich, Switzerland, and a corresponding display is effected in the operating and display member 9 which can be a simple operating and display unit with luminous display and keys for the functions listed below, to call attention to the arrival of the message. The control 7 is followed by a carrier signal 10, which can be composed of oscillators and mixers for generating the necessary converter frequencies, and which supplies receiving and transmitting converters in the receiver 3 and transmitter 11.

Upon the receipt of a routine check-back o, an answer 1 is compiled. In the routine case the data radio answers automatically. The control and monitoring device 7 then compiles the routine answer which is then switched via the FSK modulator, the transmitting converter and a power amplifier of the transmitter 11 to the antenna 1. During the time set for transmission by the vehicle, the antenna relay 2 is then switched to transmit by a control signal from device 7.

The device also operates automatically to produce a message acknowledgement k. If longer texts or special reports are transmitted, the instructions are given with the aid of the operating and display member 9 to the control and monitoring device 7 which then arranges the corresponding signals to be transmitted. For this purpose, the transmission includes, after the number of the motor vehicle, the appropriate code word, e.g., off duty, on duty, transmission of message desired, alarm, or the text stored in the data terminal 8.

For longer transmissions the central office switches, via the control and monitoring device 7, the frequencies of the transmitter 11 and the receiver 3 to the channel made available and back again at the end of the transmission. During this time, routine operation is interrupted with the knowledge of the central office.

Only a few operating and display elements are required for operation:

Display "Connection" if routine sequence or the longer transmission, respectively, operate properly. This also includes the exchange of acknowledgements k between central office and motor vehicles during longer transmissions.

Display "Malfunction" if no connection is possible or the device is malfunctioning.

Display "Message Received," possibly also as an audible signal.

Key "On Duty" with display.

Key "Operation Interrupted" with display.

Key "Message" with an addition regarding its length.

This enables the central office to make a decision regarding the type of transmission, e.g., via a free channel or during the next call-back.

Key "Alarm"; an alarm can also be generated automatically with the aid of an additional feature if the operating personnel do not perform certain manipulations in certain cases, e.g., putting in a multidigit identification number on request within a certain period of time.

The mobile station radio is a standard car radio transceiver. One possible solution is the AEG-TELEFUNKEN TELEDUX radio which has been used for this purpose for many years. Other transceivers may be used too, such as AEG-TELEFUNKEN FuG 7b, FuG 8a/8b or FuG 9. In the latter case a modification to the UHF Frequency range may be required.

The central office comprises a sequence operation unit for the transmission and receiving direction to control the time frame. Additionally a microprocessor is used to generate and evaluate the transmitted and received signals.

The control of the time frame is done as in known TDMA-Systems, e.g. systems of German und French companies such as MAT 1 by COMSAT, TDMA S-1 and TDMA S-2 or different systems of Japanese origin. A comprehensive description is published in "Aufgaben und Probleme der senderseitigen Ablaufsteuerung von TDMA-Systemen" [tasks and problems of transmitter sequence operation in TDMA-systems] by J. Dömer and B. Reidel, Frequenz 25 (1971) 10 and in "Ableitung der Regel- und Steuerkriterien der sende- und empfangsseitigen Ablaufsteuerung" [derivation of regulation - and control - criterions for transmitter and receiver sequence operations] by U. Reiner and P. C. Ulrich, Frequenz 25 (1971) 10.

Insignificant changes in comparison to the sequence operations in the articles and systems mentioned above have to be carried out, conditioned by the low bit rate (some k bits per sec.) and the longer frame duration. These changes lead to a simplification of the system. The sequence of the information transfer is as follows:

transmission - and receiving frame are shifted towards one another by the double of the travel time T (ground - satellite - ground). After the transmission of the routine inquiry to the motor vehicle a time slot will be opened in the receiving unit at the end of the travel time 2T. The length of the time slot depends on the length of the vehicle's reply to be expected.

The length of the reply is known to the central office.

The starting times of the inquiries to the vehicles and the time slots are determined by a frequency stabilized oscillator. For the evaluation of the replies coming from the vehicles and for generating the routine inquiries to the vehicles a microcomputer of the type INTEL 8049 is used.

FIG. 4 illustrates the different sequences of operation and shows the possible signal trains.

The following tables list the particular messages to be transferred between the central office and the vehicles and vice versa.

| motor vehicle (burst) No. | frame n central office transmits, motor vehicle receives | motor vehicle transmits, central office receives |
| --- | --- | --- |
| 1 | routine inquiry (RI) desire to transmit | routine reply (RR) "back on duty" |
| 2 | message of length 4 1 | RR: "ready" |
| 3 | RI | RR: "desire to transmit message of length 3 1" |
| 4 | RI | RR: "nothing new" |
| 5 | RI | RR: "off duty" |
| . | | |
| . | | |
| n − 1 | RI | RR: "nothing new" |
| n | RI | RR: "alarm" |

| motor vehicle (burst) No. | frame (n + 1) central transmits, motor, vehicle receives | motor vehicle transmits, central office receives |
| --- | --- | --- |
| 1 | RI | RR: "nothing new" |
| 2 | message of length 4 1 request to send | RR: "acknowledgement of receipt" |
| 3 | message of length | message of length 3 1 |

-continued

|       |    |                                         |
|-------|----|-----------------------------------------|
| 4     | RI | RR: "nothing new"                       |
| 5     | RI | no reply, since off duty                |
| .     |    |                                         |
| .     |    |                                         |
| .     |    |                                         |
| (n − 1) | RI | RR: "nothing new"                     |
| n     | RI | RR: "alarm"                             |
|       | frame (n + 2) |                              |
| 1     | RI | no reply, causing alarm in central office |
| 2     | RI | RR: desire to transmit message of length 2 1 |
| .     |    |                                         |
| .     |    |                                         |
| .     |    |                                         |

It will be understood that the above description of the present invention is susceptible to various modifications, changes and adaptations, and the same are intended to be comprehended within the meaning and range of equivalents of the appended claims.

What is claimed is:

1. A method for transmitting data between at least one central office and a plurality of mobile radio stations via a relay station by a time multiplex transmission procedure in which signals are transmitted in a succession of time frames and the central office transmits on a first frequency to all mobile radio stations via the relay station, said method comprising:

causing the central office to periodically transmit different messages at arbitrarily selected times, which messages include routine inquiry messages, directed to each mobile station in sequence during each time frame;

causing each mobile station to respond to an inquiry message by transmitting a selected short message on a second frequency;

causing a selected mobile station to transmit data to the central office by transmitting to the central office an announcement of the intent to transmit data during a first time frame, causing the central office to set aside reception capacity for the data in a time frame following the first time frame, and transmitting the data to the central office in the following time frame; and causing the duration of each time frame to vary, on the basis of data transmitted during at least one preceding time frame, between a minimum value determined by the time required to transmit a routine inquiry to each mobile station and a maximum value determined by the time required to transmit data of a predetermined length to each mobile station in succession and the time required to transmit data of a predetermined length from each mobile station in succession.

2. Method as defined in claim 1 wherein, during said step of causing a selected mobile station to transmit data, said step of causing the central office to set aside reception capacity is carried out by causing the central office to set aside a time slot of selected length in the time frame following the first time frame, and said step of subsequently transmitting the data is effected within that time slot.

3. Method as defined in claim 1 further comprising making at least one additional transmission channel available on at least one frequency different from the first and second frequencies when there is an increased requirement for data exchange between central office and at least one mobile radio station.

4. Method as defined in claim 1 further comprising automatically producing an alarm at the central station whenever a routine message from a mobile station is not received within a selected time period.

* * * * *